United States Patent
Barois et al.

(10) Patent No.: US 12,250,158 B2
(45) Date of Patent: Mar. 11, 2025

(54) REGULATION METHOD INTENDED TO RESORB CONGESTION ON A MESH POWERLINE AND RADIO COMMUNICATION NETWORK

(71) Applicant: SAGEMCOM ENERGY & TELECOM SAS, Rueil Malmaison (FR)

(72) Inventors: Jérôme Barois, Rueil Malmaison (FR); Clément Terrien, Rueil Malmaison (FR)

(73) Assignee: SAGEMCOM ENERGY & TELECOM SAS, Bois-Colombes (FR)

( * ) Notice: Subject to any disclaimer, the term of this patent is extended or adjusted under 35 U.S.C. 154(b) by 153 days.

(21) Appl. No.: 17/886,296

(22) Filed: Aug. 11, 2022

(65) Prior Publication Data
US 2023/0062031 A1 Mar. 2, 2023

(30) Foreign Application Priority Data
Aug. 26, 2021 (FR) ...................................... 2108919

(51) Int. Cl.
*H04L 47/12* (2022.01)
*H04L 47/28* (2022.01)

(52) U.S. Cl.
CPC .............. *H04L 47/28* (2013.01); *H04L 47/12* (2013.01)

(58) Field of Classification Search
CPC ......... H04L 45/26; H04L 45/32; H04L 47/12; H04L 47/28
See application file for complete search history.

(56) References Cited

U.S. PATENT DOCUMENTS

| 9,755,789 | B2 * | 9/2017 | Panattu | ................... H04L 43/08 |
| 10,680,839 | B2 * | 6/2020 | Li | ....................... H04L 12/1877 |
| 2013/0250754 | A1 | 9/2013 | Vasseur et al. | |
| 2014/0105033 | A1 * | 4/2014 | Vasseur | ................... H04L 45/24 370/248 |
| 2022/0006742 | A1 * | 1/2022 | Barois | ..................... H04L 47/11 |

FOREIGN PATENT DOCUMENTS

EP 2 337 283 A1 6/2011

OTHER PUBLICATIONS

May 3, 2022 Search Report issued in French Patent Application No. 2108919.

* cited by examiner

*Primary Examiner* — Donald L Mills
(74) *Attorney, Agent, or Firm* — Williams Mullen; R. Brian Drozd

(57) ABSTRACT

A regulation method and device intended to resorb congestion on a mesh communication network including a plurality of node devices using powerline communications, a route request being sent by a source node device and copies of the route request being relayed by gradual broadcasting by intermediate node devices. The intermediate node device is able to send messages on at least one frequency band by powerline and over a radio channel, and by means of the intermediate node device: detects a congestion situation, identifies route requests as being important, relays only copies of the important relay requests on a frequency band and over the radio channel, and relays copies of the non-important route requests on a frequency band or over the radio channel.

7 Claims, 4 Drawing Sheets

REGULATION METHOD INTENDED TO RESORB CONGESTION ON A MESH POWERLINE AND RADIO COMMUNICATION NETWORK

TECHNICAL FIELD

The present invention relates to the field of mesh powerline communication networks and more precisely a regulation method intended to resorb congestion on a mesh communication network.

PRIOR ART

Powerline communications PLC are developing, in particular in the context of electrical supply networks of the AMM type (the acronym signifying "automated meter management"). Communication networks are thus implemented in electrical supply networks for the automated collection, by a base node device (also referred to as a "data concentrator") in the network, from smart electricity meters, of energy consumption reading data that said smart electricity meters are respectively responsible for monitoring.

The G3-PLC communication standard is defined to enable the various node devices (in particular data concentrator and smart electricity meters) in such a network to communicate with each other. The standard is specified in the ITU-T recommendation G.9903, which describes in particular the physical layer (PHY) and the data link layer (DLL) of the OSI model (the acronym for "Open Systems Interconnection"). The G3-PLC standard is intended to be used in frequency bands ranging from 10 to 490 kHz. It supports more particularly the following frequency bands: the CENELEC A frequency band, which ranges approximately from 35 kHz to 91 kHz; the FCC frequency band, which ranges approximately from 150 kHz to 480 kHz; the ARIB frequency band, which ranges approximately from 150 kHz to 400 kHz; and the CENELEC B frequency band, which ranges approximately from 98 kHz to 122 kHz. These various frequency bands have different characteristics in terms of bit rate, range and resistance to disturbances, in particular.

In a development of the G3-PLC standard defined in an Annex H of the ITU-T recommendation G.9903 (2017) Amendment 1 (May 2021), called G3-PLC Hybrid PLC & RF, an RF (the acronym for radio-frequency) radio channel can be used in place of one of said PLC frequency bands. More precisely, this version of the standard allows the occasional use of a secondary radio physical layer based on a SUN FSK modulation as defined in IEEE 802.15.4:2015. Thus, by using the various G3-PL and RF media for transmitting data, the electrical supply network maximises its coverage and its resilience. An electrical-supply network node capable of sending and receiving data using the two media (PLC and RF) is called a hybrid node.

The networks as aforementioned are mesh communication networks that comprise a plurality of node devices forming a mesh structure, a source node device transmits messages to a destination node device by means of node devices fulfilling a role of relay. Thus a message sent by the source node device to the destination device passes through a route formed by the nodes fulfilling a tole of relay as far as the destination node.

In a mesh powerline communication network PLC relying on a routing protocol of the reactive type, such as the LOADng protocol (Lightweight On-demand Ad hoc Distance-vector Routing Protocol—Next Generation), a source node device discovers a route to a given destination node by broadcasting a route discovery request through the mesh communication network. Since a message broadcast by a node device is in general not visible at every point in said mesh communication network, the source node device broadcasts the route discovery request to each of its neighbouring node devices, in other words to each node device located within range of the source node device in the mesh communication network. Said neighbouring node devices then in their turn transmit the route discovery request to their respective neighbouring node devices. In the case where a node device is directly adjacent to the destination node device, it transmits the route discovery request only to said destination node device. A plurality of route discovery requests are thus broadcast gradually through various paths in the mesh communication network until they reach the destination node device. The destination node device then selects an optimum route among the various paths according to cost information associated with each route discovery request received and, via said optimum route, transmits a route discovery response to the source node device for activating the route.

When a route between a source node device and a destination node device is broken, the source node device attempts to repair the route by broadcasting a route repair request through the mesh communication network. However, when the mesh communication network is disturbed or a plurality of routes must be repaired simultaneously, such a route repair mechanism generates a transmission of numerous route repair requests in the mesh communication network and causes congestion of the mesh communication network. Other routes may then in their turn be broken, giving rise to the broadcasting of new route repair requests and causing an increase in the congestion on the mesh communication network. As a repercussion, the mesh communication network may then suffer congestion that may last up to several days and prevent the transmission of data other than route discovery or repair request messages.

It is therefore desirable to overcome these drawbacks of the prior art.

It is in particular desirable to provide a solution that makes it possible to quickly resorb congestion on the mesh communication network when the routes are broken. It is moreover desirable to provide a solution making it possible to favour the repair of optimum routes in the mesh communication network in a congestion context.

DISCLOSURE OF THE INVENTION

For this purpose, according to a first aspect, the invention proposes a regulation method intended to resorb congestion on a mesh communication network, the mesh communication network comprising a plurality of node devices using powerline communications, a route request being sent by a source node device and copies of the route request being relayed by gradual broadcasting by intermediate node devices to a destination node device, an intermediate node device being able to receive one or more copies of at least one route request, characterised in that the intermediate node device is able to send messages on at least one frequency band of the electrical supply network using powerline communications and over a radio channel, and the method is executed by the intermediate node device and comprises the steps of:

detecting a congestion situation when a number of route request copies received on a time window of predefined duration is higher than a predefined threshold, identifying, when a congestion situation is detected, route requests as important, a route request being identified as important when the number of copies of said route request received on the time window of predefined duration is above a second predefined threshold or greater than the number of copies of other route requests, relaying only copies of the route requests identified as important on a frequency band and over the radio channel, relaying copies of the route requests identified as not important on a frequency band or over the radio channel.

The invention also relates to a regulation device intended to resorb congestion in a mesh communication network, the mesh communication network comprising a plurality of node devices using powerline communications, a route request being sent by a source node device and copies of the route request being relayed by gradual broadcasting by intermediate node devices to a destination node device, an intermediate node device being able to receive one or more copies of at least one route request, characterised in that the intermediate node device is able to send messages on at least one frequency band of the electrical supply network using powerline communications and over a radio channel, and the regulation device is included in the intermediate node device and comprises:

means for detecting a congestion situation when a number of route request copies received on a time window of predefined duration is higher than a predefined threshold, means for identifying, when a congestion situation is detected, route requests as important, a route request being identified as important when the number of copies of said route request received on the time window of predefined duration is above a second predefined threshold or greater than the number of copies of other route requests, means for relaying only copies of the route requests identified as important on a frequency band and over the radio channel, means for relaying copies of the route requests identified as not important on a frequency band or over the radio channel.

According to a particular embodiment of the invention, the method further comprises the step of relaying copies of the route requests identified as not important on a frequency band and over the radio channel when a number of route request copies received on a time window of predefined duration is below a third predefined threshold.

According to a particular embodiment of the invention, the copies of the route requests identified as important are relayed by relaying as a priority the route requests the number of copies of which received by the intermediate node device is the highest.

According to a particular embodiment of the invention, the copies of the route requests relayed when the number of route request copies received on the time window of predefined duration is above the first predefined threshold comprise predefined information that indicates that the number of route request copies received on a time window of predefined duration is above the first predefined threshold.

According to a particular embodiment of the invention, each node device receiving a route discovery response to a relayed request comprising the predetermined information inserts, with the corresponding route stored in its routing table, a duration of validity of the route less than the duration of validity of the route when the predetermined information is not present in the discovery response received.

The present invention also relates to a computer program product, it comprises instructions for implementing, by a node device, the method according to one of the preceding embodiments, when said program is executed by a processor of the node device.

The present invention also relates to a storage medium. It stores a computer program comprising instructions for implementing, by a node device, the method according to one of the preceding embodiments, when said program is executed by a processor of the node device.

BRIEF DESCRIPTION OF THE DRAWINGS

The features of the invention mentioned above, as well as others, will emerge more clearly from the reading of the following description of an example embodiment, said description being made in relation to the accompanying drawings, among which.

DETAILED DISCLOSURE OF EMBODIMENTS

Figure 1:
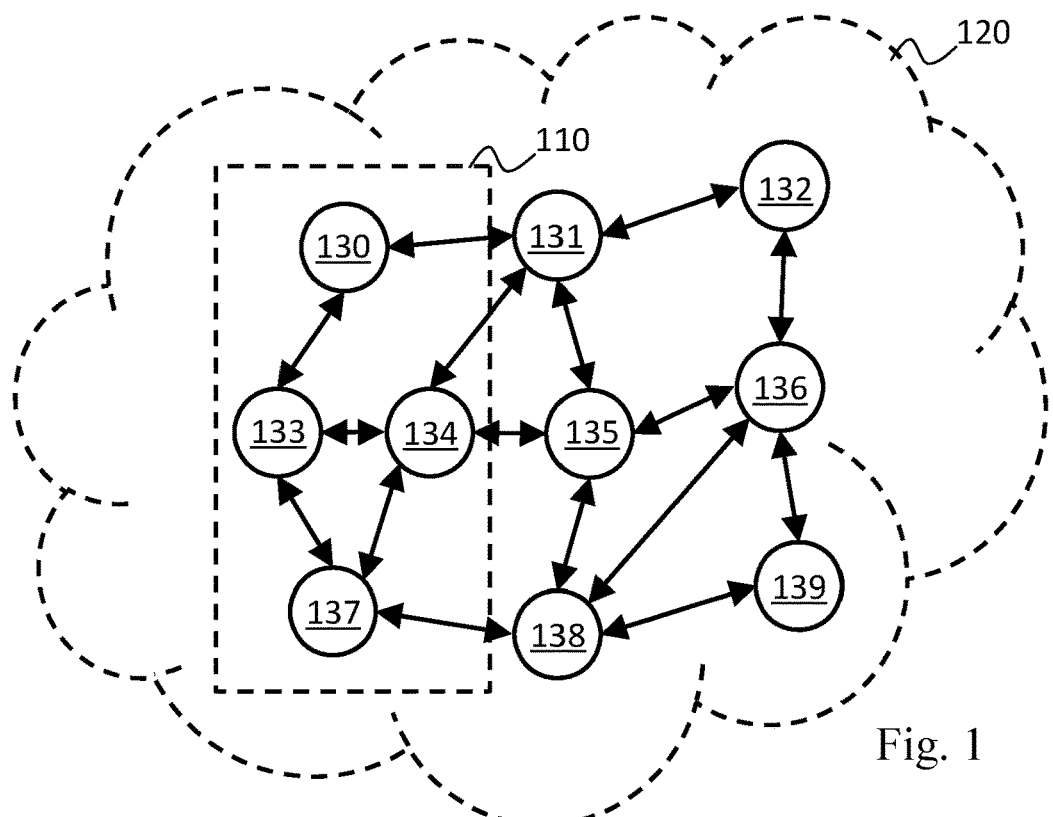
FIG. 1 illustrates schematically a communication network according to one embodiment.

FIG. 1 illustrates schematically a mesh communication network 120. The mesh communication network 120 is for example an electrical supply network of the AMM type. The mesh communication network 120 relies on powerline communications PLC or radio-frequency RF communications for enabling a base node device (also called a "data concentrator") to collect, from smart electricity meters, energy consumption reading data from electrical installations that said smart electricity meters are respectively responsible for monitoring. The data concentrator and the smart electricity meters are thus node devices of the mesh communication network 120. The mesh communication network 120 may comprise other node devices, for example installed at electrical transformers. The communication network 120 therefore has a mesh structure, as shown schematically on FIG. 1 by means of arrows, where node devices fulfil the role of relays for increasing the range of communications in the mesh communication network 120, as detailed below. Thus, one and the same smart electricity meter potentially has available several paths for reaching the data concentrator, and vice versa. In the remainder of the document, the terms "smart electricity meter" and "meter" are used interchangeably.

The present invention is thus particularly adapted to the context of G3-PLC Hybrid PLC & RF technology as defined in the ITU-T recommendation G.9903 (2017) Amendment 1 (May 2021) and more particularly in Annex H.

The mesh communication network 120 thus comprises a plurality of node devices 130, 131, 132, 133, 134, 135, 136, 137, 138, 139. A network neighbourhood is associated with each node device in the mesh communication network 120. On FIG. 1, the node device 133 is associated with a network neighbourhood 110 encompassing node devices 130, 134 and 137. This is because, in the mesh communication network 120, a signal or a message broadcast by a node device (such as the node device 133) is in general not visible at every point in said communication network. Each node device sending signals or messages then has a network neighbourhood, i.e. a subset of said mesh communication network 120 wherein any node device can intelligibly receive said signals or messages directly coming from the node device that broadcast said signals or messages. The network neighbourhood corresponds to the range of the signals sent, according to predetermined transmission parameters (e.g. power, modulation and coding scheme, network topology, etc.) of the node device at the source of said signals and also potentially according to characteristics of the communication channel (attenuation, noise, impedance, etc.).

The mesh communication network 120 relies on a routing protocol of the reactive type, such as the LOADng protocol ("Lightweight On-demand Ad hoc Distance-vector Routing Protocol—Next Generation"). Unlike the routing protocols of the proactive type, which rely on a global knowledge of network topology, the routing protocols of the reactive type rely on on-demand route discoveries, each node device in the network then needing solely to have knowledge of its own network neighbourhood to route data in the mesh communication network 120.

To discover a suitable route in the mesh communication network 120 from a source node device (for example the node device 133) to a destination node device (for example the node device 132), it is known for the source node device to broadcast a route discovery request, called RREQ ("Route REQuest"). This route discovery request is received by each node device in the network neighbourhood of said source node device. Each node device in the network neighbourhood of said source node device relays, by broadcasting, said request if said node device in question is not the destination node device. By gradual broadcasting, a plurality of route discovery requests are typically received by the destination node device, each of these requests having followed a different path in the mesh communication network 120.

Each node device that is at the origin of a message, such as for example a route discovery request, includes therein an identifier that is particular to it, as well as a sequence number, as defined in the LOADng protocol. This sequence number is a counter value particular to each node device of the mesh communication network 120. Each time a node device generates a new message, said node device increments its counter and includes in the message in question the value of said counter. Thus, when a node device receives a message, said node device analyses the identifier of the node device originating the message and the sequence included in the message, and can determine whether the message received is actually a new message or a new copy of a message already received.

Each node device can however decide not to relay a route discovery request when one or more criteria are not met. In particular, before deciding to relay said request, the node device in question typically checks whether said request comprises information representing a route cost, from the source node device to the node device in question, that is better than the route cost represented by information contained in another route discovery request previously received by the node device in question. In other words, the node device in question relays, by broadcasting, said request if said request relates to a path that has followed, from the source node device to the node device in question, a pathway with a lower cost than any other request previously received by the node device in question (and therefore for the same route discovery).

The cost of a route may be based on one or more metrics. For example, the route cost is a number of hops made by the request in question from the source node device. According to another example, the route cost is the result of a calculation that depends on the bandwidth of the links crossed, by the request in question, from the source node device and/or on the quality of the communication links. According to yet another example, the route cost is proportional to the latency undergone by the request in question from the source node device. Other metrics can be used for establishing a route cost, i.e. a transit cost, from the source node device to the destination node device. According to yet another example, the route cost also depends on the medium, i.e. radio or PLC, used for transmitting the data between two successive nodes.

When a node device decides to relay, by broadcasting, a route discovery request, the node device in question updates the route cost information contained in said request, so as to take into account the fact that said request is passed by the node device in question. Thus, according to such a principle, a plurality of route discovery requests typically arrive at the destination node device, each comprising information on the cost of the route that said request followed to be propagated from the source node device to the destination node device. The pathway followed by said route discovery request associated with the best route cost is next selected to enable the source node device to transmit data to the destination node device. To activate the route in question, the destination node device transmits a route discovery reply, called RREP ("Route REPly"). This route discovery reply is transmitted gradually by following the path that is the reverse of the route discovery request that was associated with the best route cost. Each node device receiving the route discovery reply updates an internal routing table, at the data link layer DLL, in order to indicate therein that any subsequent message transmitted in unicast mode from the source node device in question to the destination node device in question must be transmitted or relayed to such and such a node device of its network neighbourhood. Within the link layer, the routing tables are preferentially implemented in an adaptation sublayer responsible for implementing the routing protocol in the communication network. For example, this adaptation sublayer is in accordance with the 6LoWPAN protocol (standing for "IPv6 over Low power Wireless Personal Area Networks"), which was initially developed for supporting IPv6 in the context of IEEE 802.15.4. It should be noted that the 6LoWPAN protocol is itself based on the routing protocol of the aforementioned reactive LOADng type. A hybrid abstraction layer provides suitable services to the adaptation sublayer with a view to sending/receiving data to/from the appropriate MAC ("Medium Access Control") sublayer, i.e. RF or PLC.

By means of the routing tables thus configured, unicast communications can be made by any pair of node devices in the mesh communication network 120. Intermediate node devices therefore serve as relays when the node devices in said pair are not in the network neighbourhood of each other, and the communications thus take place gradually, each node device relying on one of its own neighbours to convey messages to their respective destinations.

A route between a source node device and a destination node device may be broken, because for example of routing difficulties related to a disturbance on the mesh communication network 120. A route repair mechanism is then initiated and involves the source node device in question broadcasting a new route request, or more precisely a route repair request comprising a new sequence number. The route request being relayed by gradual broadcasting to the node devices of the mesh communication network 120, such a route repair mechanism increases the risk of the occurrence of a situation of congestion of the mesh communication network 120.

In order to avoid such a situation of congestion and according to the present invention, each node device can detect a start of congestion by comparing a route request rate (i.e. the number of route requests over a time window of predefined duration) received at a first predefined threshold, referred to as saturation threshold. As long as the rate remains below the saturation threshold, the node device remains in a first mode, referred to as nominal mode, wherein a route request received is relayed systematically on at least one frequency band and over the radio channel by broadcasting in the network neighbourhood of said node device. When the rate reaches or exceeds the saturation threshold, the node device goes into a second mode, referred to as degraded mode. In the degraded mode, the node device relays only the route requests considered to come from an important node, on at least one frequency band and over the radio channel, for the other nodes considered to be not important, the node device relays the route requests received either on a frequency band or over the radio channel according to the congestion of the frequency band and of the radio channel.

The applicable modulation schemes (and corresponding demodulation schemes) are preferentially multicarrier modulation schemes (and respectively demodulation schemes) of the OFDM type ("Orthogonal Frequency Division Multiplex") for the at least one frequency band or SUN-FSK (Smart Utility Network—Frequency Shift Keying) for the RF radio channel.

In terms of frequency bands that can be used in the context of the implementation of the mesh communication network 120, mention can be made of: the CENELEC A frequency band, which ranges approximately from 35 kHz to 91 kHz; the FCC frequency band, which ranges approximately from 150 kHz to 480 kHz; the ARIB frequency band, which ranges approximately from 150 kHz to 400 kHz; and the CENELEC B frequency band, which ranges approximately from 98 kHz to 122 kHz and the RF radio channel, which ranges from approximately 863 MHz to 870 MHz. It is then possible to use: a first thirty-six carrier modulation scheme in the CENELEC A frequency band; a second sixty-two carrier modulation scheme in the FCC frequency band; a third fifty-four carrier modulation scheme in the ARIB frequency band; a fourth sixteen carrier modulation scheme in the CENELEC B frequency band and a fifth modulation scheme of the SUN-FSK type for the RF radio channel of G3-PLC Hybrid PLC & RF. The SUN-FSK modulation is defined in section 20 of the document IEEE 802.15.4:2015.

Figure 2:
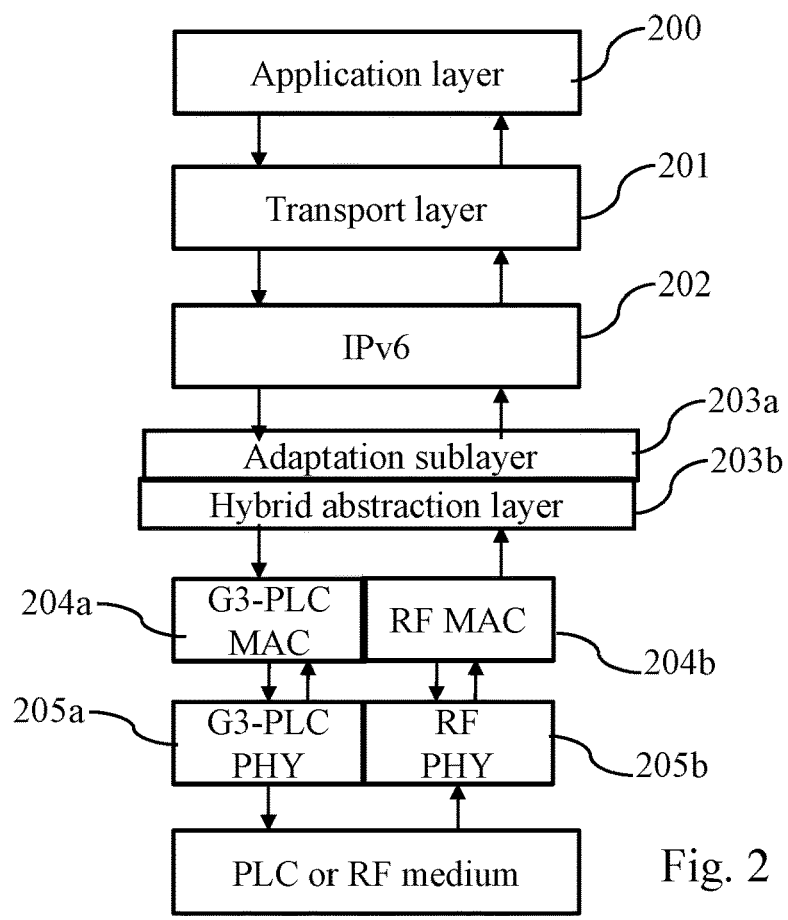
FIG. 2 illustrates schematically the various layers of an OSI model in the particular case of the G3-PLC Hybrid PLC & RF standard.

FIG. 2 illustrates schematically the various layers of an OSI model in the particular case of the G3-PLC Hybrid PLC & RF standard as defined in Annex H of the ITU-T recommendation G.9903 (2017) Amendment 1 (May 2021).

A message to be transmitted coming from an application layer 200 is transmitted to a transport layer 201. The transport layer 201 contains all the protocols responsible for managing errors and controlling the network flows. The two main protocols used are the TCP and UDP protocols. The transport layer 201 creates packets by adding headers to the data coming from the application layer 200. The packets are next transmitted to the IP layer, e.g. IPv6 202. The IP layer 202 encapsulates the packets coming from the transport layer 201 by adding in particular an IPv6 header. An IPv6 packet can do up to 1400 bytes. In the case where the packet has a size above a threshold value, this packet is fragmented into at least two fragments in order to adapt it to the constraints of a MAC layer, in particular to the size of the MAC frames.

For this purpose, the G3-PLC Hybrid PLC & RF standard incorporates the 6LoWPAN protocol, which makes it possible to adapt IPv6 data packets to the constraints of the MAC layers, in particular by fragmenting them. This is because the MAC frames used are of much smaller sizes (400 bytes maximum available per packet for the IP part) than the IPv6 packets of 1400 bytes.

The IPv6 packets are transmitted to an adaptation sublayer 203*a* that incorporates the 6LoWPAN protocol, which where applicable fragments them. Naturally, in the case of an IPv6 packet that is sufficiently small to be contained in a single G3-PLC MAC or RF MAC frame, no fragmentation is performed.

A hybrid abstraction layer 203*b* next transfers the fragment or the IP packet in the case of absence of fragmentation to the appropriate MAC sublayer 204*a* or 204*b*, according to the medium selected for transmission thereof.

Hereinafter the term fragment is used for designating both a fragment obtained from a fragmented IP packet or the IP packet itself in the case of absence of fragmentation.

The transmission of a fragment on the PLC medium, i.e. on the current line, conventionally comprises various steps, in particular a segmentation of the fragments in order to adapt them to the G3-PLC physical layer PHY 205*a* and an OFDM modulation of the signal. The segmentation consists in partitioning a MAC frame into PSDUs (the English acronym for "PHY Service Data Unit"). All the PSDUs coming from one and the same fragment are modulated using the same modulation scheme.

The transmission of a fragment over the RF radio channel comprises various steps, in particular a segmentation of the fragments in order to adapt them to the RF radio physical layer PHY 205*b* and a SUN-FSK modulation of the signal. As in the PLC case, the segmentation consists in partitioning a MAC (the English acronym for "Media Access Control") frame into PSDUs (the English acronym for "PHY Service Data Unit"). All the PSDUs coming from one and the same fragment are modulated using the same modulation scheme. The specification of the RF radio physical layer PHY 205*b* is given in sections 10, 11 and 20 of IEEE 802.15.4-2015 as amended by the document IEEE 802.15.4v: 2017 and supplemented by Table H-5-1 of the ITU-T recommendation G.9903 (2017) Amendment 1 (May 2021).

Figure 3:
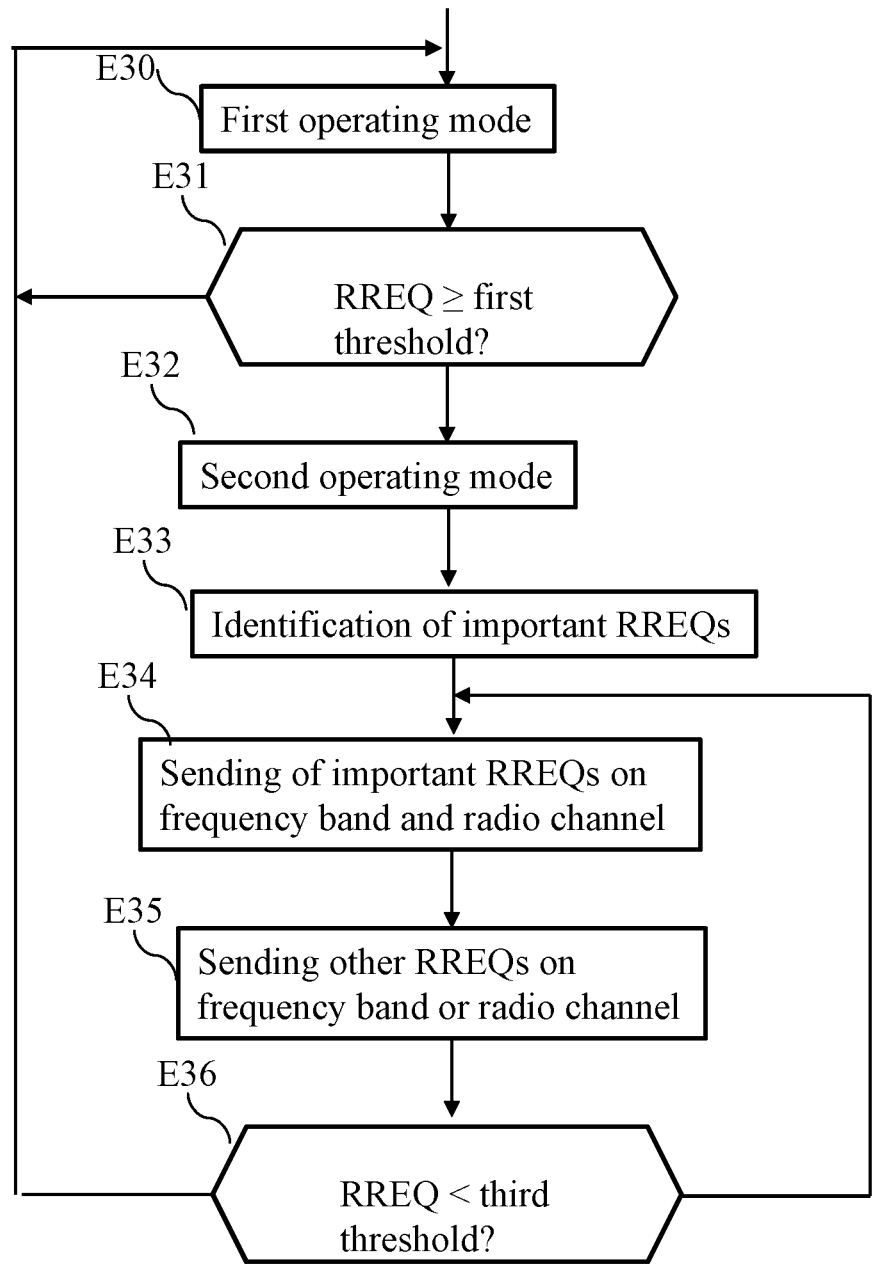
FIG. 3 illustrates schematically a regulation method intended to resorb congestion on the mesh communication network using at least one frequency band and a radio channel according to the present invention.

FIG. 3 illustrates schematically a regulation method intended to resorb congestion of the mesh communication network using at least one frequency band and a radio channel according to the present invention.

The method is executed continuously by each node device, referred to as an intermediate node device, of the mesh communication network 120. The intermediate node device is a node device of the mesh communication network 120 that receives route requests for which said intermediate node device is neither the source node nor the destination node.

In a first step E30, the intermediate node device is in a first operating mode referred to as nominal mode. In the nominal mode, the intermediate node device relays each route request received to its network neighbourhood on a frequency band and over the radio channel, or directly to the destination node device if said destination node device belongs to the network neighbourhood of the intermediate node device.

In a step E31, the intermediate node device determines whether it is in a congestion situation. For this purpose, the intermediate node device compares the number of route requests received on a time window of predefined duration with a first saturation threshold. The first saturation threshold is for example equal to 10. The predefined duration is for example one minute. If the number of route requests received on the time window of predefined duration exceeds the first saturation threshold, the intermediate node device detects a congestion situation and goes into a second operating mode referred to as degraded mode at the step E32. Otherwise the intermediate node device remains in the nominal mode corresponding to the step E30 and continues to relay by broadcasting each route request received on a frequency band and over the radio channel.

At the step E33, the intermediate node device identifies route requests as important in order to favour the repair of the corresponding routes. A route request is considered to be important at the intermediate node device when the number of said route request that is received on the time window of predefined duration, for example during one minute, said route request being sent by the same source node and comprising the same sequence number, is above a second predefined threshold, referred to as the minimum transmission threshold. Each route request sent by the same source node and comprising the same sequence number is considered to belong to one and the same group of route requests.

In a variant, the route request in one and the same group of route requests that have been received the largest number of times in the time window of predefined duration are considered to be important.

In a variant, the various route requests of N groups of requests, with N integer greater than or equal to two and less than the maximum number of different groups of route requests received in the time window of predefined duration, are considered to be important.

This is because, the larger the number of route requests belonging to one and the same group received by an intermediate node device, the greater the probabilities of said intermediate node device fulfilling an important role of relay for the route in question. Thus the intermediate node device can favour, in a congestion situation, the repair of the routes for which said intermediate node device potentially fulfils an important relay role.

In a step E34, the intermediate node device relays, on a frequency band and over the radio channel, to its network neighbourhood, the route requests identified as important at the step E33.

In a step E35, the intermediate node device relays, on a frequency band and over the radio channel, to its network neighbourhood, the route requests not identified as important at the step E33.

When the discovery requests are relayed in the degraded mode, the intermediate node device inserts in each route request predetermined information that indicates that the intermediate node device is functioning in the degraded mode. This predetermined information is used by the node devices, when they store the route corresponding to the discovery request, for inserting in the routing table a restricted lifetime in the time of the route.

The route discovery response, when it is transmitted gradually, following the reverse path to the route discovery request that was associated with the best route cost, also comprises the predetermined information that indicates that the intermediate node device is functioning in the degraded mode.

For example, a restricted lifetime is between 10 and 30 minutes whereas a lifetime in the nominal mode is greater than 2 hours.

The choice between the frequency band or the radio channel is for example made by determining the occupation level of the G3-PLC frequency band using a mechanism utilised in the method for listening on a CSMA/CA (Carrier Sense Multiple Access with Collision Avoidance) multiple access medium. The mechanism makes it possible to check at any time whether the frequency band is occupied or not. The occupation level is calculated by measuring, during a second time window, the frequency band occupation time.

The occupation level of the radio channel is for example determined by measuring, during the time window, the radio channel occupation time.

The radio channel or the frequency band selected is the one having the lowest occupation level.

In a step E36, the intermediate node device determines whether it is in a decongestion situation. For this purpose, the intermediate node device compares the number of route requests received over the time window of predefined duration with a third saturation threshold. The third saturation threshold is for example equal to 5. The predefined duration is for example one minute. If the number of route requests received over the time window of predefined duration is below the third saturation threshold, the intermediate node device detects a decongestion situation and returns to the step E30. If not, the intermediate node device returns to the step E34.

Figure 4:
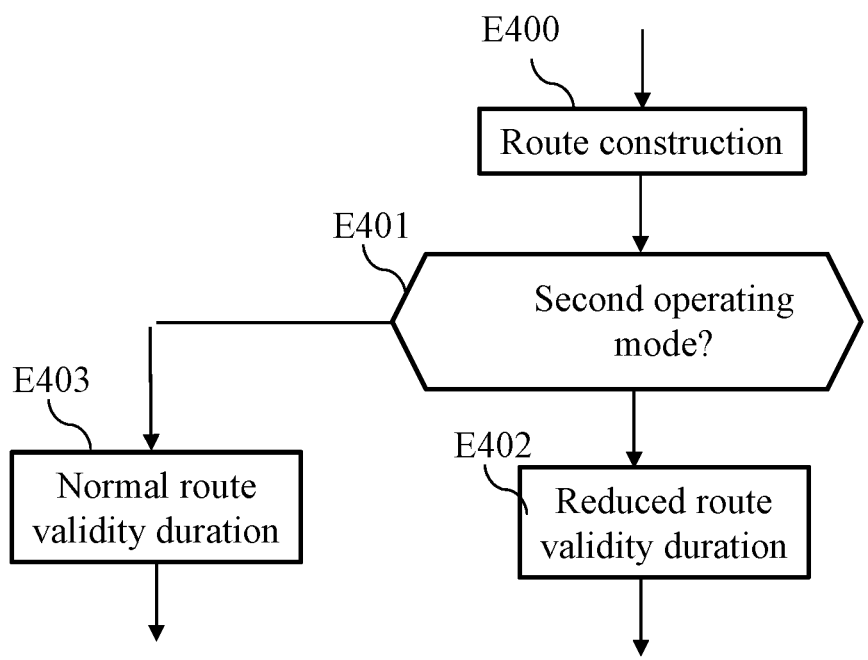
FIG. 4 illustrates schematically a method for enriching a routing table used in a mesh communication network using at least one frequency band and a radio channel according to the present invention.

FIG. 4 illustrates schematically a method for enriching a routing table used in a mesh communication network using at least one frequency band and a radio channel according to the present invention.

The method is implemented continuously by each node device during the storage of a route in its routing table when a route discovery response is received.

In the step E400, the node device inserts a route in its routing table.

In the step E401, the node device checks whether the route discovery response received comprises the predetermined information.

If so, the node device passes to the step E402 and for the route inserts information indicating that the route has a reduced duration of validity. For example, the duration of validity is between 10 and 30 minutes. The duration of validity is for example selected randomly between 10 and 30 minutes. The duration of validity of the route is less than the duration of validity of the route when the predetermined information is not present in the discovery response received.

If not, the node device passes to the step E403 and does not for the route insert information indicating that the route has a reduced duration of validity.

Figure 5:
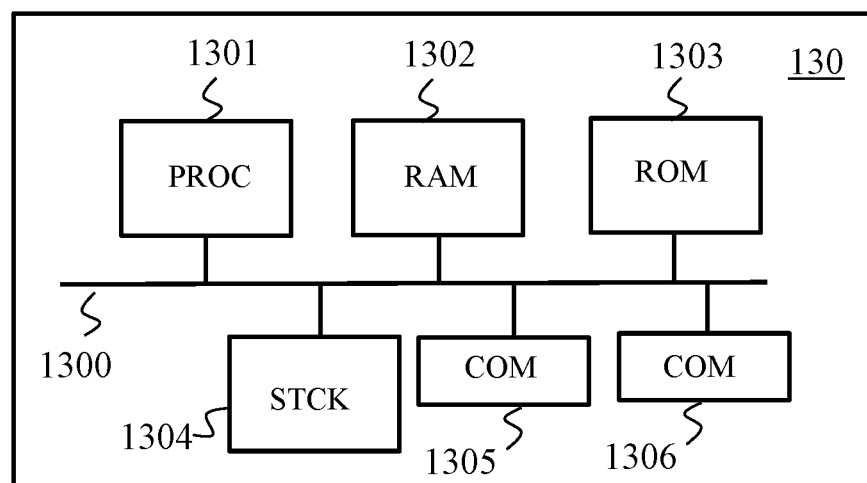
FIG. 5 illustrates schematically an example of hardware architecture of a node device of the communication network according to one embodiment.

FIG. 5 illustrates schematically an example of hardware architecture of a node device of the communication network according to one embodiment.

Such a node device is termed multiband since it is capable of transmitting a message over a plurality of frequency bands. It should be noted that FIG. 5 could also illustrate schematically an example of hardware architecture of a processing module included in the node device.

According to the example of hardware architecture shown in FIG. 5, the node device 130 then comprises, connected by a communication bus 1300: a processor or CPU (central processing unit) 1301; a random access memory RAM 1302; a read only memory ROM 1303; a storage unit such as a hard disk (or a storage medium reader, such as an SD (Secure Digital) card reader 1304; at least one communication interface 1305 enabling the node device 130 to communicate with the node devices belonging to its neighbourhood, e.g. the nodes 131 and 133.

The processor 1301 is capable of executing instructions loaded in the RAM 1302 from the ROM 1303, from an external memory (not shown), from a storage medium (such as an SD card), or from a communication network. When the node device is powered up, the processor 1301 is capable of reading instructions from the RAM 1302 and executing them. These instructions form a computer program causing the implementation, by the processor 1301, of all or some of the methods described in relation to FIGS. 3 and 4.

The methods described below in relation to FIGS. 3 and 4 can be implemented in software form by executing a set of instructions by a programmable machine, for example a DSP (digital signal processor) or a microcontroller, or be implemented in hardware form by a machine or a dedicated component, for example an FPGA (field-programmable gate array) or an ASIC (application-specific integrated circuit). In general, the node device 130 comprises electronic circuitry configured for implementing the methods described in relation to FIGS. 3 and 4.

The invention claimed is:

1. A regulation method intended to resorb congestion on a mesh communication network, the mesh communication network comprising a plurality of node devices using powerline communications, a route request being sent by a source node device and copies of the route request being relayed by gradual broadcasting by intermediate node devices to a destination node device, an intermediate node device being able to receive one or more copies of at least one route request, wherein the intermediate node device is able to send messages on at least one frequency band of the electrical supply network using powerline communications and over a radio channel, and said method causing the intermediate node device to perform:
  detecting a congestion situation when a number of route request copies received on a time window of predefined duration is higher than a predefined threshold,
  identifying, when a congestion situation is detected, route requests as important, a route request being identified as: (1) important when the number of copies of said route request received on the time window of predefined duration is above a second predefined threshold or greater than the number of copies of other route requests, or (2) not important when the number of copies of said route request received on the time window of predefined duration is below the second predefined threshold or less than the number of copies of other route requests,
  relaying only copies of the route requests identified as important on a frequency band and over the radio channel,
  relaying copies of the route requests identified as not important on a frequency band or over the radio channel.

2. The method according to claim 1, wherein said method causing the intermediate node device to perform relaying copies of the route requests identified as not important on a frequency band and over the radio channel when a number of route request copies received on a time window of predefined duration is below a third predefined threshold.

3. The method according to claim 1, wherein the copies of the route requests identified as important are relayed by relaying as a priority the route requests the number of copies of which received by the intermediate node device is the highest.

4. The method according to claim 1, wherein the copies of the route requests relayed when the number of route request copies received on the time window of predefined duration is above the first predefined threshold comprise predefined information that indicates that the number of route request copies received on a time window of predefined duration is above the first predefined threshold.

5. The method according to claim 4, wherein each node device receiving a route discovery response to a relayed request comprising the predetermined information inserts, with the corresponding route stored in its routing table, a duration of validity of the route less than the duration of validity of the route when the predetermined information is not present in the discovery response received.

6. A non-transitory storage medium that stores a computer program comprising instructions for implementing, by a node device, the method according to claim 1, when said program is executed by a processor of the node device.

7. A regulation device intended to resorb congestion in a mesh communication network, the mesh communication network comprising a plurality of node devices using powerline communications, a route request being sent by a source node device and copies of the route request being relayed by gradual broadcasting by intermediate node devices to a destination node device, an intermediate node device being able to receive one or more copies of at least one route request, wherein the intermediate node device is able to send messages on at least one frequency band of the electrical supply network using powerline communications and over a radio channel, and the regulation device is included in the intermediate node device and comprises circuitry causing the device to implement:
  detecting a congestion situation when a number of route request copies received on a time window of predefined duration is higher than a predefined threshold,
  identifying, when a congestion situation is detected, route requests as important, a route request being identified as: (1) important when the number of copies of said route request received on the time window of predefined duration is above a second predefined threshold or greater than the number of copies of other route requests or (2) not important when the number of copies of said route request received on the time window of predefined duration is below the second predefined threshold or less than the number of copies of other route requests,
  relaying only copies of the route requests identified as important on a frequency band and over the radio channel,
  relaying copies of the route requests identified as not important on a frequency band or over the radio channel.

* * * * *